Dec. 20, 1938.   F. C. EMRICK   2,140,990
FIFTH WHEEL
Filed Aug. 20, 1936   2 Sheets-Sheet 1

INVENTOR:
Frank C. Emrick,
BY
Barnwell R. King,
HIS ATTORNEY.

Dec. 20, 1938.  F. C. EMRICK  2,140,990
FIFTH WHEEL
Filed Aug. 20, 1936  2 Sheets—Sheet 2

INVENTOR:
Frank C. Emrick,
BY
Barnwell R. King,
HIS ATTORNEY.

Patented Dec. 20, 1938

2,140,990

UNITED STATES PATENT OFFICE 2,140,990

FIFTH WHEEL

Frank C. Emrick, Kalamazoo, Mich.

Application August 20, 1936, Serial No. 97,005

5 Claims. (Cl. 280—33.1)

This invention relates to fifth wheels, and more particularly to that type used for connecting a trailer to an automotive tractor.

The main objects of my invention are:

First, to provide a fifth wheel that is simple and economical in its parts, self locking, and very efficient and effective in operation.

Second, to provide a fifth wheel for large trucks or tractors, which is very substantial, long wearing, comparatively light in weight, and which is neat and compact in appearance.

Third, to provide improved means for locking and unlocking the coupling mechanism.

Referring to the drawings.

Figure 1:
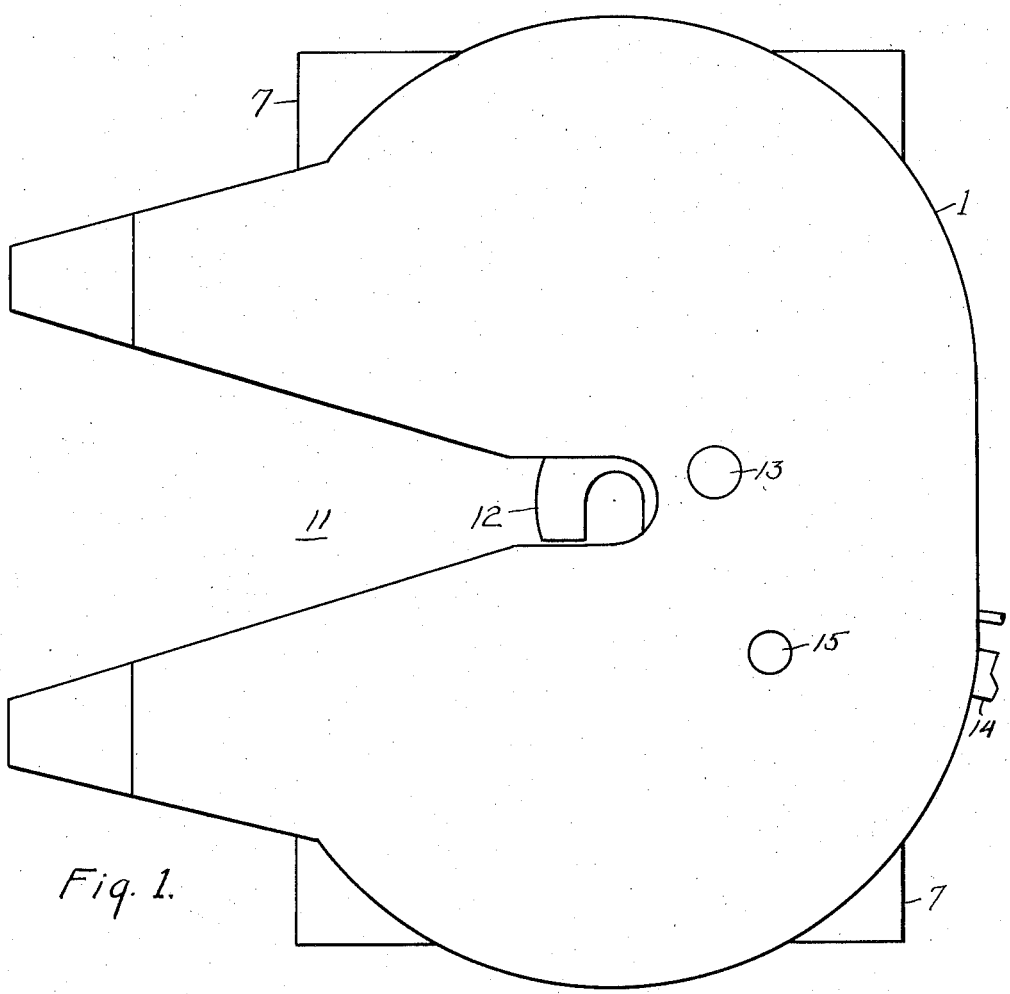
Fig. 1 is a fragmentary top plan view of a fifth wheel embodying my invention.
Figure 2:
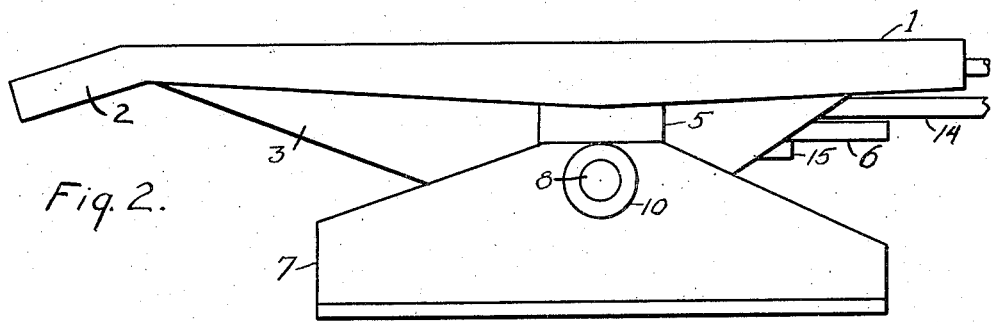
Fig. 2 is a fragmentary view in side elevation of the fifth wheel.
Figures 3, 4:
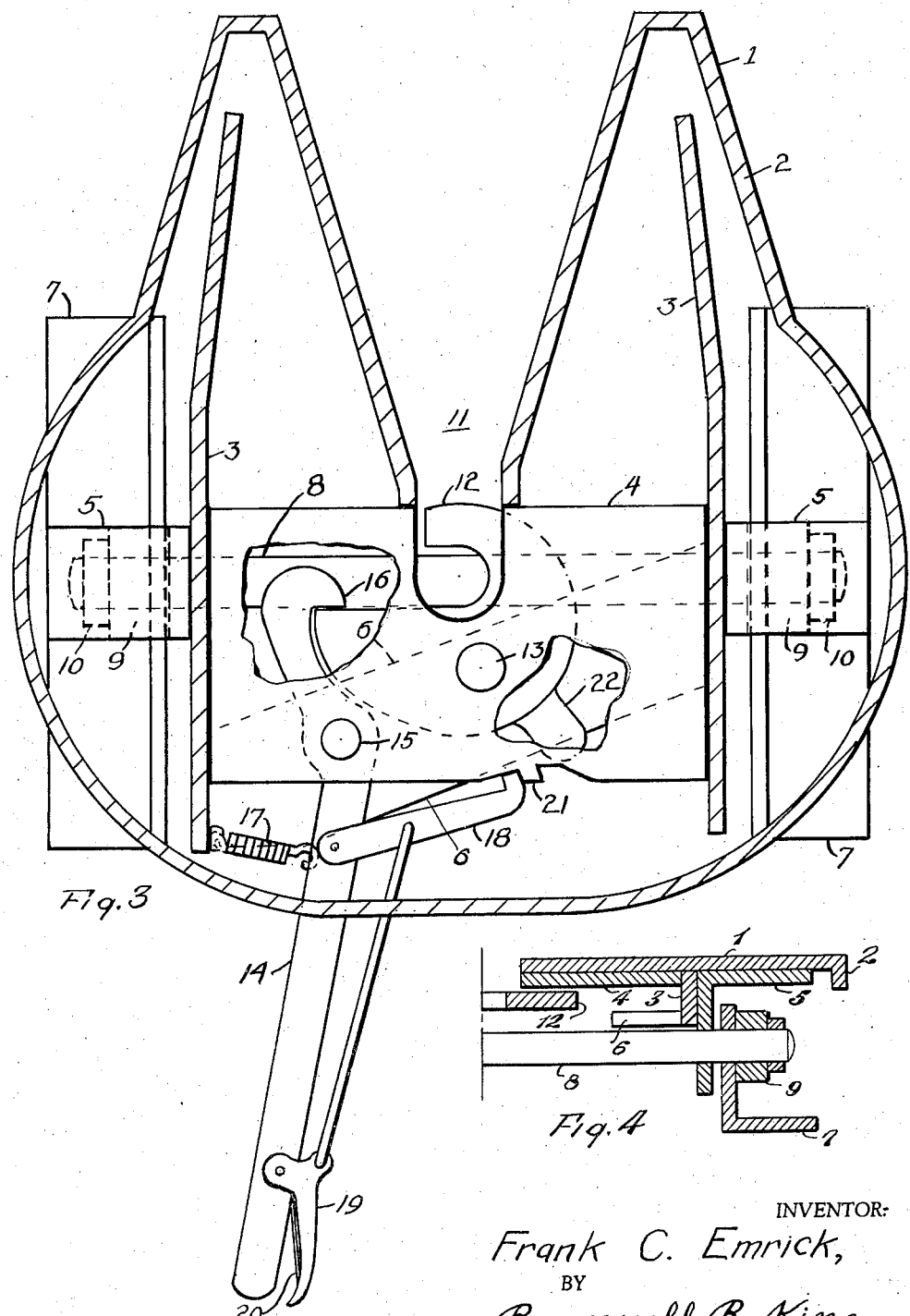
Fig. 3 is a horizontal sectional view of the device looking downwardly just below the top plate.
Fig. 4 is a sectional view through one side of the device, this view being taken along the line 4—4 of Fig. 2.

My fifth wheel comprises a top plate 1 having a depending peripheral flange 2. Supporting ribs 3, 3 are welded to the bottom of the top plate, a reinforcing plate 4 being disposed under the top plate and between the supporting ribs and welded thereto. The angle members 5, 5 are disposed at the outer sides of the supporting ribs 3 and are welded thereto and to the bottom of the top plate.

A bottom plate 6 is spaced from the reinforcing plate and is welded to the supporting ribs. The parts thus fabricated are preferably of hard rolled steel. The top plate has a smooth bearing surface over its entire upper area and withstands wear to a remarkable degree. The top plate is not only strong and light, but it cannot break and will stand a great deal of abuse. This results from the use of rolled steel parts fabricated in the manner pointed out above.

The fifth wheel is supported by bolsters 7, 7, the fifth wheel being connected to the bolsters by a trunnion shaft 8. The shaft is supported by bearings 9, 9 welded to the bolsters, the shaft being held in place by end collars 10, 10. The fifth wheel is thus free to turn about a horizontal axis in a manner and for a purpose well understood by those skilled in the art.

The trailer bolster plate (not shown) is provided with a depending king pin having an annular groove. The top plate 1 is provided with a forwardly opening recess 11 for guiding the king pin toward the center of the tractor fifth wheel when the tractor is backed under the trailer. The king pin is connected to the tractor fifth wheel by a main hook-up cam 12 which is disposed between the reinforcing plate 4 and the bottom plate 6. The hook-up cam has a pin 13 mounted in the top reinforcing and bottom plates.

Also disposed between the reinforcing and bottom plates is a hand lever 14 having a pin 15 mounted in the top, reinforcing and bottom plates. The hand lever has a catch 16 normally engaging the hook-up cam 12 to prevent the latter from opening in use. The hand lever is urged toward operative position by a spring 17.

The hand lever is provided with a latch 18 controlled by the handle 19, the latter having a spring 20 urging the latch into engagement with the stop 21 on the reinforcing plate 4 to lock the hand lever in "on" position and to latch it in "off" position. The parts are shown locked in normal or operating position. The king pin (not shown) of the trailer is engaged by the main hook-up cam 12, the cam fitting in the king pin groove.

The bolster plate of the trailer (not shown) rests on the smooth all-over bearing surface on the top plate 1, a lubricant being disposed therebetween. Sometimes in service the lubricant becomes exhausted causing prior devices to wear rapidly, but by using a rolled steel plate I eliminate such wear, the wheel merely squealing and warning the operator of the lack of lubricant.

The tractor is uncoupled from the trailer by grasping the control handle 19 to release the latch 18 from the stop 21. The hand lever is then swung to cause the catch 16 to clear the main hook-up cam 12, and the handle 19 is released, causing the latch 18 to engage the opposite side of the stop 21. This latches the hand lever in open position with the lug 22 on the right of the latch 18. The main hook-up cam is then free to open, and it is moved to open position by the forward movement of the tractor. In so moving, the lug 22 unlatches the latch 18 and the catch 16 rides on the hook-up cam 12, leaving the mechanism free to automatically lock when the hook-up cam is returned to closed position.

With the parts in "off" position the backing of the tractor under the trailer causes the king pin (not shown) to turn the main hook-up cam 12 counter clockwise. This results in the catch 16 engaging the main hook-up cam 12 and the latch 18 engaging the stop 21 and locking the hand lever 14 in on position. The parts are thus automatically locked with the trailer coupled to the tractor.

An important feature of my fifth wheel is the fabrication of rolled steel parts, which results in a very substantial, long wearing, and neat fifth wheel which is much lighter than prior types. My self locking mechanism is absolutely foolproof and in addition is durable, easy to operate, and simple in construction. For example, my fifth wheel having a thirty (30) ton capacity weighs only two hundred and fifteen (215) lbs., and is only six and one half (6½) inches high, although the length is thirty-four (34) inches and the width thirty (30) inches.

The entire upper surface of my top plate coacts with the trailer bolster plate to provide a large and unbroken bearing area. This is very desirable and provides a highly efficient and long wearing fifth wheel.

Another feature of my invention resides in the positioning of the pins 13 and 15 upon opposite sides of the longitudinal axis of the structure whereby both of these pins receive a share of the pulling strain and this pulling strain is located therebetween.

Yet another very material feature of my invention resides in the shape of the top plate whereby it will withstand more readily the strains and stresses encountered in actual service and also tend to equalize and distribute these strains. In other words, the front of the plate is rather snub nosed with curved sides, all of the exterior edge of the plate carrying a depending flange. The curved sides permit proper formation and make possible the addition of this flange, new in this art, and this not only strengthens the plate but also serves as a concealing housing for the several moving parts.

It will be noted that these flanges are continued inwardly along the king pin recess and serve as guiding means therefor.

I claim:

1. A fifth wheel comprising a top plate, spaced supporting ribs secured to the bottom of said top plate, a reinforcing plate secured to the bottom of said top plate and extending between and engaging said ribs, a bottom plate spaced from said reinforcing plate and secured to said ribs, a hook-up cam disposed between said reinforcing plate and said bottom plate and having a pin mounted in said plates, a hand lever disposed between said reinforcing plate and said bottom plate and having one end thereof conformed to provide a catch engaging said hook-up cam to hold the latter in closed position, a spring urging said hand lever toward catch closing position, a spring actuated latch for locking said hand lever in on position and latching it in off position, and a lug on said hook-up cam for retracting said latch to release said hand lever when said hook-up cam is turned either toward open or closed position.

2. A fifth wheel comprising a top plate, spaced supporting ribs secured to the bottom of said top plate, a reinforcing plate secured to the bottom of said top plate and extending between and engaging said ribs, a bottom plate spaced from said reinforcing plate and secured to said ribs, a hook-up cam disposed between said reinforcing plate and said bottom plate and having a pin mounted in said plates, a lever disposed between said reinforcing plate and said bottom plate and having one end thereof conformed to provide a catch engaging said hook-up cam to hold the latter in closed position, a spring urging said lever toward catch closing position, latch means for locking said hand lever in on position and for locking it in off position, and means controlled by said hook-up cam for releasing said latch means when said hook-up cam is turned either toward open or closed position.

3. A fifth wheel comprising a hook-up cam, a hand lever having one end conformed to provide a catch for engaging and holding said hook-up cam in closed position, spring means urging said hand lever toward catch closing position, a spring actuated latch adapted to lock said hand lever in closed position or latch it in open position against the force of said spring means, and a cam lug on said hook-up cam acting to momentarily retract said latch when the hook-up cam is turned in either direction between open and closed position.

4. A fifth wheel comprising a top plate, spaced ribs secured to the bottom of said top plate, a reinforcing plate secured to the bottom of said top plate between said ribs, a bottom plate spaced from said reinforcing plate and secured to said ribs, a hook-up cam disposed to turn between said bottom and reinforcing plates and having a pin mounted in said plates, a hand lever disposed to work between said bottom and reinforcing plates and having a pin mounted in said plates, one end of said hand lever being conformed to provide a catch engaging said hook-up cam to normally hold the latter in closed position, said pins being disposed on opposite sides of the longitudinal center of said top plate so that rotational strain on said hook-up cam is transmitted to said plates as a pulling strain, means biasing said hand lever so that said catch tends to engage said hook-up cam, and a biased latch adapted to hold said hand lever in on or off position, said hook-up cam acting when turned toward open position to release said latch to release said hand lever the catch of which thereupon rides upon said hook-up cam for locking engagement therewith when the hook-up cam is turned to closed position.

5. A fifth wheel comprising a top plate, spaced ribs secured to the bottom of said top plate, a bottom plate spaced from said plate and secured to said ribs, a hook-up cam disposed to turn between said plates and having a pin mounted in said plates, a hand lever disposed to work between said plates and having a pin mounted in said plates, one end of said hand lever being conformed to provide a catch engaging said hook-up cam to normally hold the latter in closed position, said pins being disposed so that rotational strain on said hook-up cam is transmitted to said plates as a pulling strain; means biasing said hand lever so that said catch tends to engage said hook-up cam, and a biased latch adapted to hold said hand lever in on or off position, said hook-up cam acting when turned toward open position to release said latch to release said hand lever the catch of which thereupon rides upon said hook-up cam for locking engagement therewith when the hook-up cam is turned to closed position.

FRANK C. EMRICK.